US009218068B2

(12) United States Patent
Zhang et al.

(10) Patent No.: US 9,218,068 B2
(45) Date of Patent: Dec. 22, 2015

(54) SHARING DATA INPUTS BETWEEN MULTIPLE PERIPHERAL DEVICES AND HOST BY CONVERTING INPUTS INTO OPERATING SYSTEM INDEPENDENT OR SPECIFIC FORMAT(S) BASED ON INPUT DEVICE

(75) Inventors: Dan Zhang, Beijing (CN); Shoumeng Yan, Beijing (CN); Peng Guo, Beijing (CN); Gansha Wu, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/976,021

(22) PCT Filed: Nov. 3, 2011

(86) PCT No.: PCT/CN2011/081765
§ 371 (c)(1),
(2), (4) Date: Jul. 1, 2014

(87) PCT Pub. No.: WO2013/063787
PCT Pub. Date: May 10, 2013

(65) Prior Publication Data
US 2014/0379946 A1    Dec. 25, 2014

(51) Int. Cl.
*G06F 3/00* (2006.01)
*G06F 3/023* (2006.01)
*G06F 3/038* (2013.01)
*G06F 9/54* (2006.01)

(52) U.S. Cl.
CPC .............. *G06F 3/0231* (2013.01); *G06F 3/038* (2013.01); *G06F 9/542* (2013.01)

(58) Field of Classification Search
USPC ............... 710/62–68; 455/41.2; 345/168, 156
See application file for complete search history.

(56) References Cited

U.S. PATENT DOCUMENTS

| 6,664,949 B1* | 12/2003 | Amro et al. ................... 345/168 |
| 8,750,799 B2* | 6/2014 | Giles et al. ................... 455/41.2 |
| 2010/0306501 A1* | 12/2010 | Chang et al. ................... 712/31 |

FOREIGN PATENT DOCUMENTS

| CN | 101661304 A | 3/2010 |
| CN | 102184013 A | 9/2011 |
| JP | 10214139 A | 8/1998 |

OTHER PUBLICATIONS

International Search Report and Written Opinion, Mailed Date: Aug. 9, 2012, Application No. PCT/CN2011/081765, Filed Date: Nov. 3, 2011, pp. 9.

* cited by examiner

*Primary Examiner* — Tammara Peyton
(74) *Attorney, Agent, or Firm* — Kacvinsky Daisak Bluni PLLC

(57) ABSTRACT

An apparatus may include a processor arranged to receive an input signal from an input device and a first event conversion module. The first event conversion module may receive an input event from the input device as an operating system (OS)-specific event arranged in a format operable by a first operating system, convert the OS-specific event into a converted event having an OS-independent format, and dispatch the converted event for processing. Other embodiments are disclosed and claimed.

26 Claims, 19 Drawing Sheets

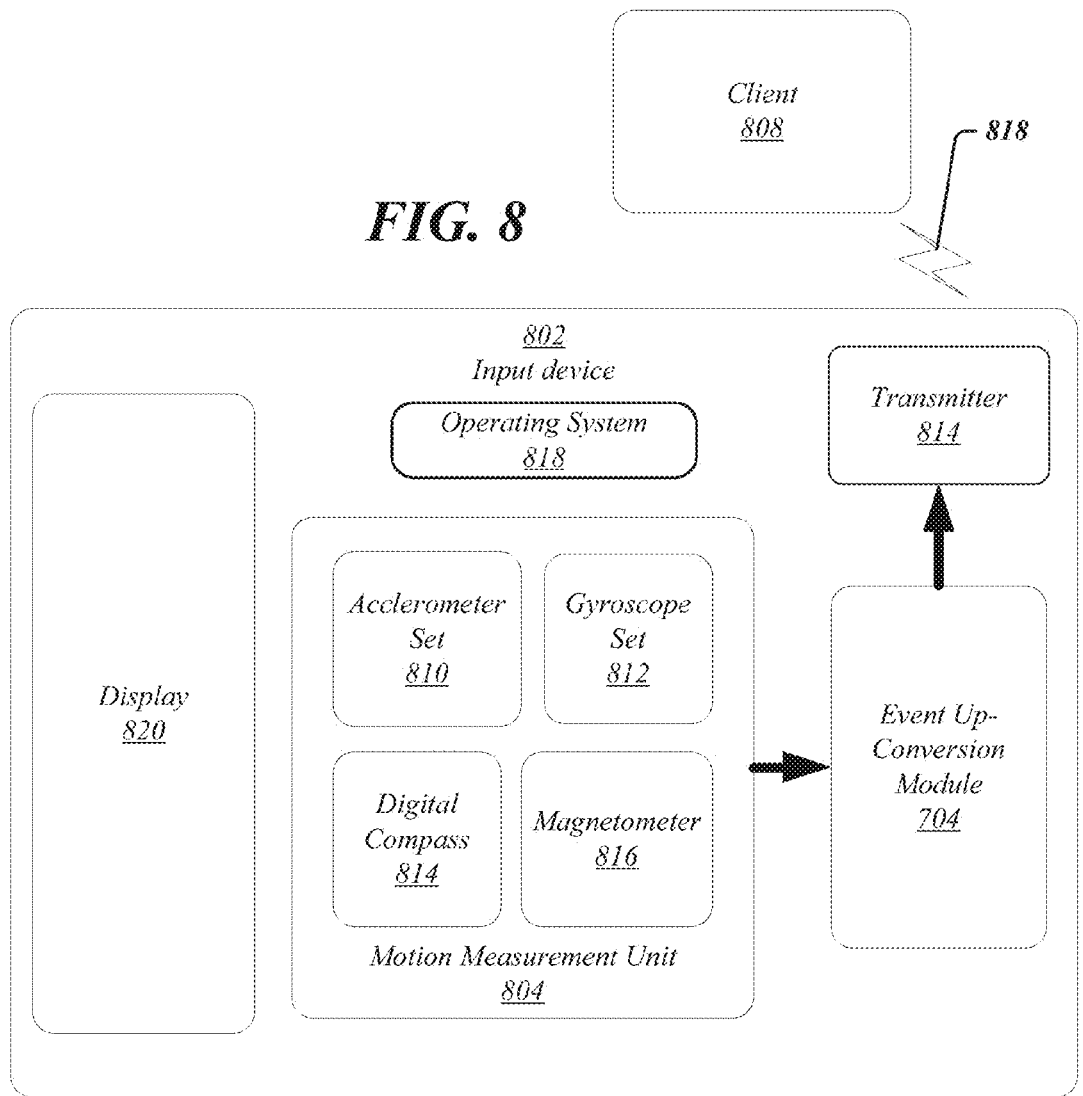

SHARING DATA INPUTS BETWEEN MULTIPLE PERIPHERAL DEVICES AND HOST BY CONVERTING INPUTS INTO OPERATING SYSTEM INDEPENDENT OR SPECIFIC FORMAT(S) BASED ON INPUT DEVICE

BACKGROUND

In the present day, it is common to use multiple different electronic devices on a regular basis that each may have different interfaces for controlling operation. Many present day mobile devices such as smart phones, PDAs, other mobile phones, tablet computers, and the like may have a touch screen interface which provides an intuitive and facile means for operating the mobile device. Moreover, the design of such devices provides an aesthetic appeal and may also offer reliable performance due to the simplicity of the touch screen user interface. However, many applications provided on such mobile devices may not be ideally suited to a touch screen interface. These applications include electronic mail (email), blogging, instant messaging, performing hybrid microblogging-messaging using services such as Twitter, and other forms of writing. Accordingly, many potential uses and applications afforded by a mobile device may be underused or performed in a cumbersome manner.

In another context, many large electronic devices such as television or similar large display devices may have a relatively cumbersome and limited interface to control operation, such as that provided by a typical remote control device. In another context, the use of a keyboard and mouse may be inadequate for controlling actions in animated or video games, thereby limiting the use of such games in computers or other devices only equipped with a keyboard or mouse.

Accordingly, there may be a need for improved techniques and apparatus to solve these and other problems.

BRIEF DESCRIPTION OF THE DRAWINGS

FIG. 8 depicts one embodiment in which an input device includes an event up-conversion module and a motion measurement unit.

DETAILED DESCRIPTION

Various embodiments involve an input sharing system and architecture that may be deployed, for example, for sharing inputs among multiple devices in a home or office environment. The input sharing architecture may employ an event relay process. The input sharing facilitated by the present embodiments may be employed to provide an enhanced user interaction with a client by providing a user-friendly interface to control the client. The term "client," as used herein, generally refers to a hardware component, a software component, or combination of hardware and software, that receives events from an input device to control operation of the client.

Figure 1:
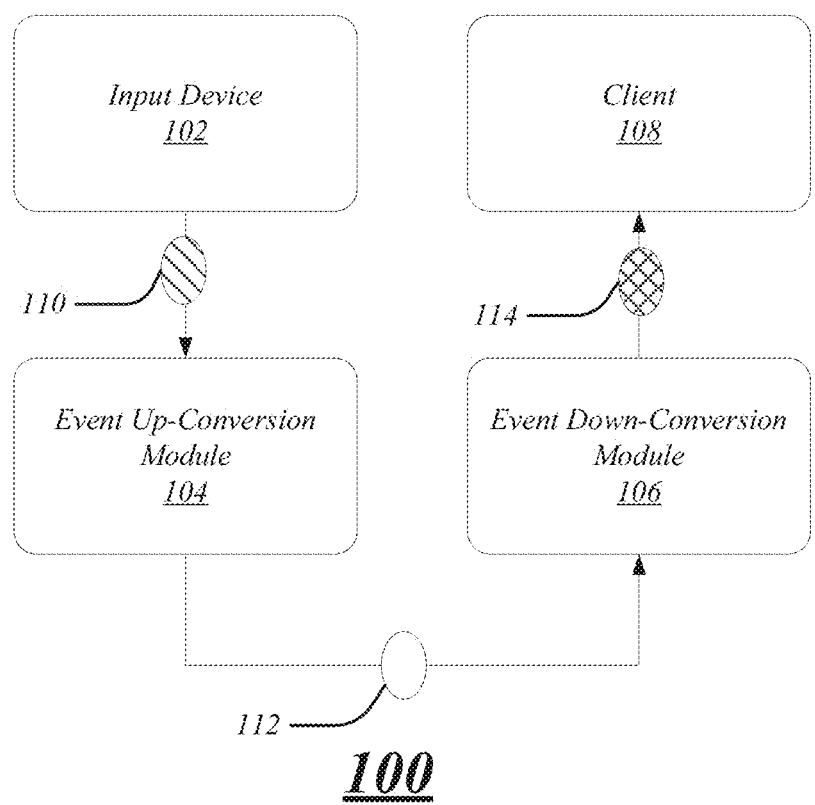
FIG. 1 depicts an embodiment of an input sharing system.

FIG. 1 depicts an embodiment of an input sharing system 100. In the arrangement of system 100, an input device may be coupled to a client 108 so that a user can control or otherwise interact with the client 108 using the input device 102. Coupling of the input device 102 to client 108 may occur in an ad-hoc manner in which the input device 102 is used to occasionally direct operations in the client and may otherwise be used for additional purposes. Examples of input devices 102 may include without limitation remote controls, pointing devices, keyboards, keypads, trackballs, trackpads, touchscreens, joysticks, game controllers, sensors, biometric sensors, thermal sensors, motion sensors, directional sensors, microphones, microphone arrays, video cameras, video camera arrays, global positioning system devices, mobile computing devices, laptop computers, desktop computers, handheld computing devices, tablet computing devices, netbook computing devices, smart phones, cellular telephones, wearable computers, and so forth. The embodiments are not limited in this context.

In various embodiments, the client 108 may be hardware device, an application running on a hardware device, or other software component, or combination of hardware and software. Examples of hardware embodiments of client 108 include without limitation electronic devices such as a display, an analog display, a digital display, a television display, audio speakers, headphones, a printing device, lighting systems, warning systems, mobile computing devices, laptop computers, desktop computers, handheld computing devices, tablet computing devices, netbook computing devices and so forth. Further examples of devices include hardware such as a home appliance, tool, vehicle, or other machine in which the any or the aforementioned electronic devices may be embedded. The embodiments are not limited in this context.

In various embodiments, the system 100 may include components that link an input device and client in which the input device 102 is regulated by a different operating system than that used for client 108. The term "operating system" (also referred to as OS) in used herein to refer to software that may include programs and data executable on an electronic device for managing hardware resources and executing application programs, among other tasks. Examples of operating systems include known commercial systems and open source platforms including Linux based OS. As is commonly the case in a home or office environment, the system 100 may be deployed in where multiple electronic devices that use different operating systems are operated in close proximity to one another. The system 100 depicted in FIG. 1 provides a communications link between such devices via an event up-conversion module 104 (also termed an event up-converter) that functions to receive events from the input device 102. The events 110 may be created by input device 102 in an operating system (OS)-specific format, such as the format provided by an operating system used to control applications and/or hardware functions of input device 102. Event up-conversion module 104 may then process the events 110 to render the events in an OS-independent format as discussed in more detail below. Event up-conversion module 104 may output up-converted events 112, which may be transmitted to an event down-conversion module 106 that converts the OS-independent format of up-converted events 112 into an OS-specific format. In this manner, the down converted events 114 can be processed in a format compatible with an operating system used by client 108.

In this manner, an input device such as a keyboard, mouse, handheld device, or other input device may be employed to control a client that does not "speak the same language" as the input device. This provides a greater flexibility for using clients 108 that may not have built in functionality including the user interface, sensors, or controls that may be available in the input device 102. In various embodiments, as detailed below, event down-conversion modules as well as up-conversion modules may be deployed to conveniently increase functionality or ease of use of a hardware device.

Figure 2:
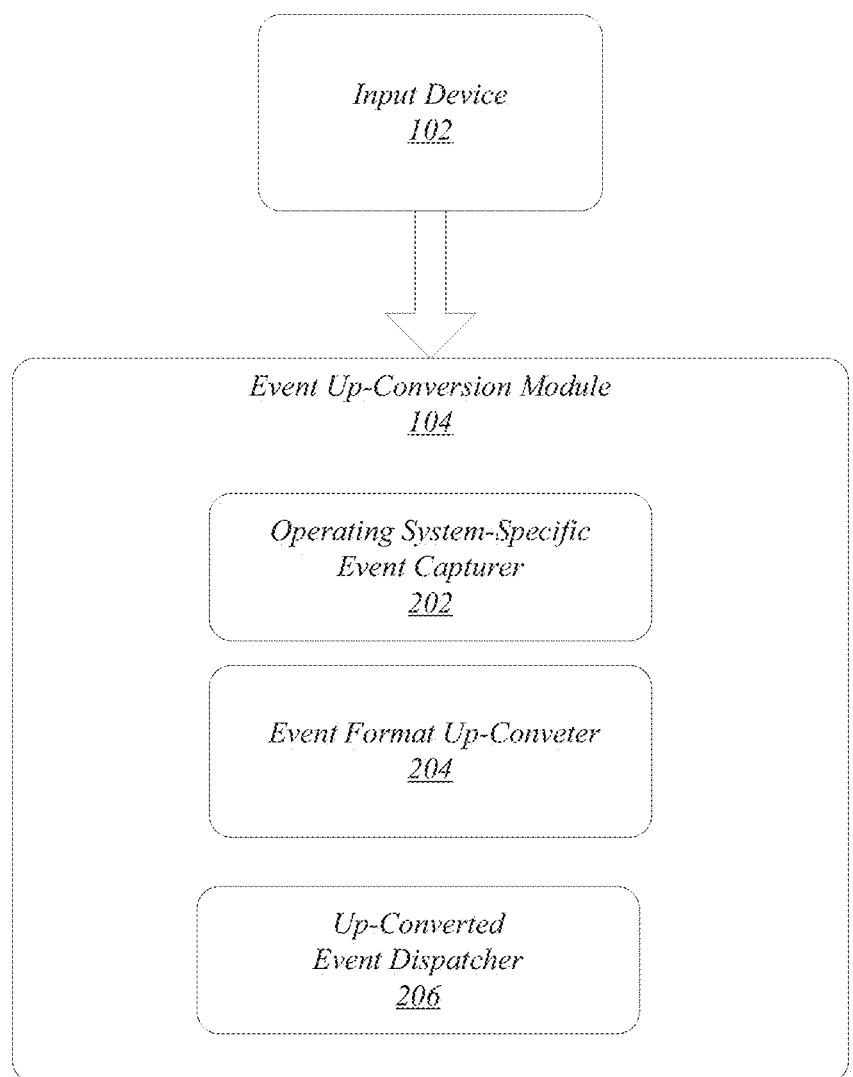
FIG. 2 depicts an embodiment of event up-conversion module.

FIG. 2 depicts an embodiment of event up-conversion module 104 showing various components for processing events received from input device 102. An operating system-specific event capturer 202 may be arranged to capture events as received in the format determined by the operating system of input device 102. Event up-conversion module 104 further includes an event format up-converter 204 that is arranged to convert the format of OS-specific events into an OS-independent format. An up-converted event dispatcher may prepare the up-converted events that are now in the OS-independent format for transfer to a client.

Figure 3:
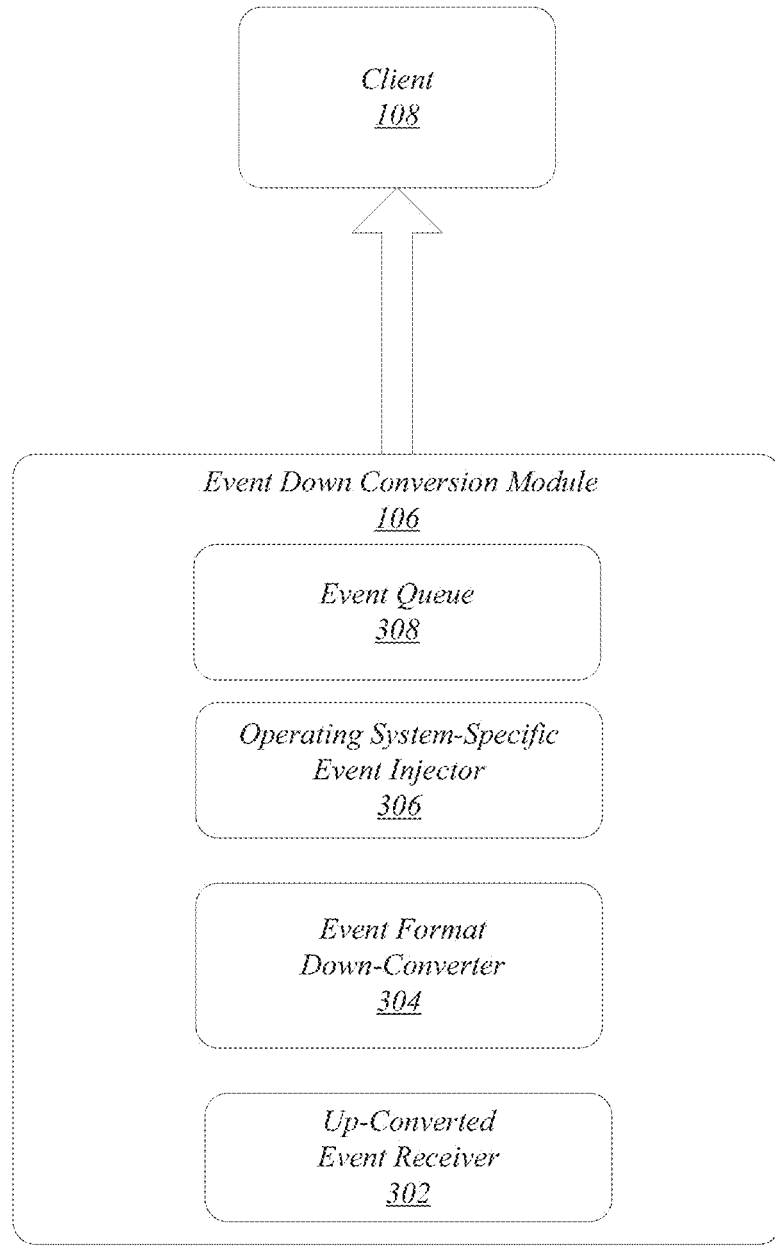
FIG. 3 depicts an embodiment of event down-conversion module.

FIG. 3 depicts an embodiment of event down-conversion module 106 that includes an up-converted event receiver 302. The up-converted event receiver 302 may receive up-converted events transmitted from an event up-conversion module as described hereinabove. The up-converted events may be communicated between event up-conversion module 104 and event down-conversion module using any appropriate communication mechanism, such as TCP socket. Event down-conversion module 106 also includes an event format down-converter 304. In various embodiments, the event format down-converter 304 may convert an event received in an OS-independent format into an OS-specific format appropriate for the client to process the event. The event down-conversion module 106 further includes an OS-specific event injector 306 for placing events that are down-converted into an event queue 308, which may be an OS-specific event accessing mechanism. In this manner, an event that is transmitted from the input device 102 in an event format that is initially incompatible with the OS of the client 108 may be prepared into a format that can be interpreted and processed by the client 108.

In various embodiments, the OS-specific components such as the OS-specific event capturer 202 and OS-specific event injector 306 may employ a user-level event manipulation interface provided by known operating systems. In one example, the OS-specific event capturer 202 may be Linux based in which an abstract event layer is situated in an input subsystem and arranged to expose input events as virtual files (e.g., eventX) under "dev/input." Thus, an open file descriptor for the event node may be "dev/input/eventX." This may facilitate the ability for user-level programs to write them more easily. In addition, the abstract event layer may mask the underlying hardware and driver details involved. A similar procedure may be adopted for OS-specific event injector 306.

Figure 4:
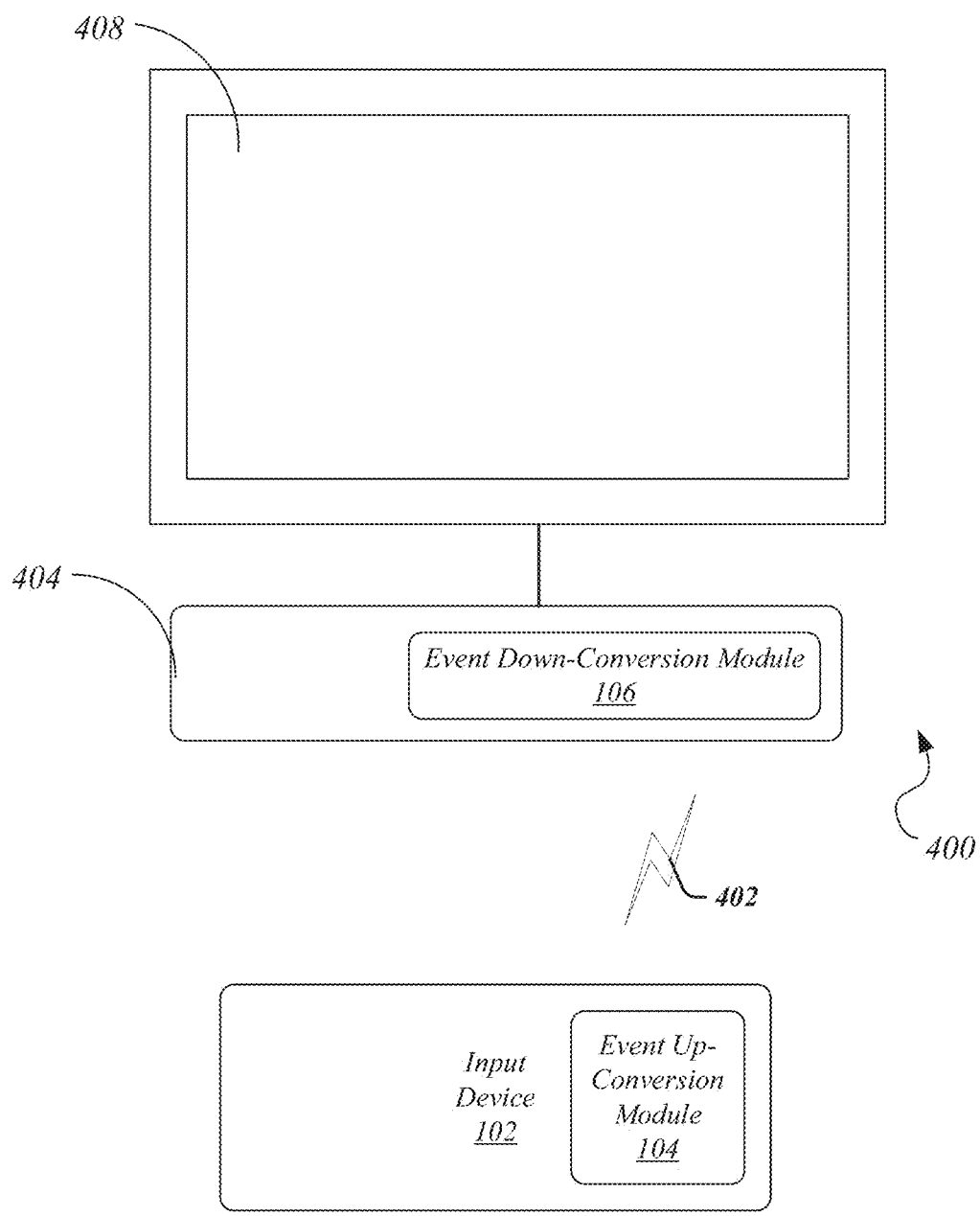
FIG. 4 depicts one an embodiment in which the input device is coupled to a client through a wireless link.

In some embodiments, an event up-conversion module, such as event up-conversion module 104, may be deployed within an input device. In some embodiments, event up-conversion module 104 may be hardwired into computing device circuitry while in other embodiments up-conversion module may include software that may be stored in any convenient medium and is coupled to other components of the input device so as to be operable in the input device. FIG. 4 depicts one such embodiment in which the input device 102 is coupled to an external system 400 through a wireless link 402. The input device 102 may generate input events in an OS-specific format that are up-converted into an OS-independent format and wirelessly transmitted to external system 400. These transmitted events may be used to control functions within a client 408, which may be a display device in some embodiments. As depicted in FIG. 4, in the external system 400 is a component 404 coupled to client 408. The component 404 contains the event down-conversion module 106 and may down-convert events received from input device 102 for use by client 408. However in some embodiments, an event down-conversion module may be included within a client.

Figure 5:
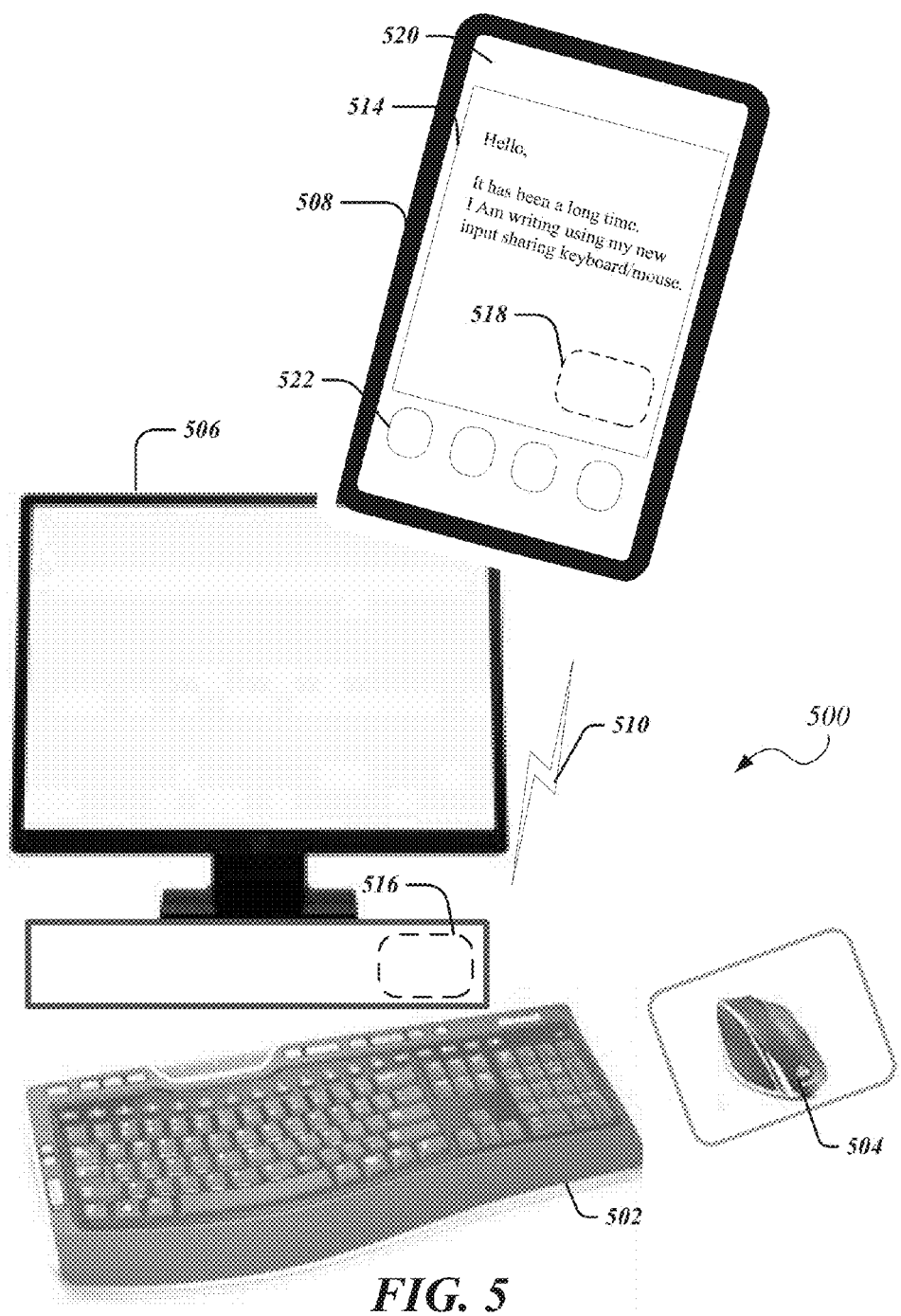
FIG. 5 depicts one embodiment of input sharing in which components of a computing system may be deployed to control a client.

FIG. 5 depicts one embodiment of input sharing in which components of a computing system 500 may be deployed to control a client 508. In the scenario depicted in FIG. 5, the computing system (computer) 500 includes a keyboard 502, mouse 504, and computer display 506. Other computing components of system 500 such as storage components, processors, and interface components are not explicitly illustrated. In one mode of operation, the keyboard 502 may be employed as an input device for computing system 500. Accordingly, a user may employ keyboard 502 to perform known activities such as creating electronic mail, creating or editing documents stored locally on the computer 500 or for editing or creating online documents, and the like. The results of such activity may be displayed on computer display 506. In addition, the user may employ the mouse 504 to perform known functions such as scrolling menus or pages, highlighting and selecting items, and executing operations shown on display 506. In some embodiments, the keyboard 502 and/or mouse 504 may be wireless devices.

In a second, "input sharing," mode of operation, components such as keyboard 502 and/or mouse 504 may be employed by a user to control client 508 using wireless links 510. In the example explicitly depicted in FIG. 5, keyboard 502 is employed to provide typed input via wireless link 510 into application 514, which may be an electronic mail application running on client 508. In one example, the keyboard 502 and mouse 504 may be operable using a first operating system 516 that is different from operating system 518 of client 508.

In order to facilitate communication between keyboard 502 and client 508, in some embodiments, the keyboard 502 may include an event up-conversion module 104 (not shown in FIG. 5) as discussed above with respect to FIGS. 1, 2 and 4. Via event up-conversion module 104, when a user performs an action on keyboard 502, that action may be translated into an OS-independent format, which is forwarded over wireless link 510 to client 508. In order to down-convert the events from an OS-independent format, client 508 may also include an event down-conversion module 106 (not shown in FIG. 5) that is arranged as discussed above with respect to FIGS. 1 and 3. Thus, keystrokes entered on keyboard 502 may be transformed into events that are properly interpreted by application 514 of client 508 while running OS 518. The events originally output as keystrokes from keyboard 502 are thereby transformed into the appropriate text arranged in the proper syntax and format within application 514, as illustrated in FIG. 5.

In the above manner, the embodiment of FIG. 5 provides an added "keyboard" functionality to client 508, which may greatly enhance the user experience with client 508. For example, for the purposes of text input the client 508 may contain a touch screen 520 but no keyboard or other manual user interface. The touch screen may contain software-generated icons 522 that represent applications available on can be manipulated as in known devices, such as smartphones, tablet computers, PDAs, and the like. The client 508 may be operable to provide a software simulated keyboard on the touch screen, for example. However, use of a virtual keyboard may produce an inferior client experience due to the inability of icons arranged in a small form factor to closely emulate keys or buttons arranged on a full size keyboard. In addition, in comparison to a keyboard, the minimal force response supplied by touch screens may provide much less feedback to a user while the user is performing a selection. Accordingly, when the user needs to perform text- and or number-intensive activities, such as working with text documents, tables, data, and the like, the user may prefer to employ keyboard 502. In this manner, the user may use the client 508, which may be a mobile device, in a conventional touch screen mode for many uses that are not text-intensive and may reserve the latter for occasions when the client is in proximity to keyboard 502 and the keyboard 502 is not otherwise occupied.

Figure 6A:
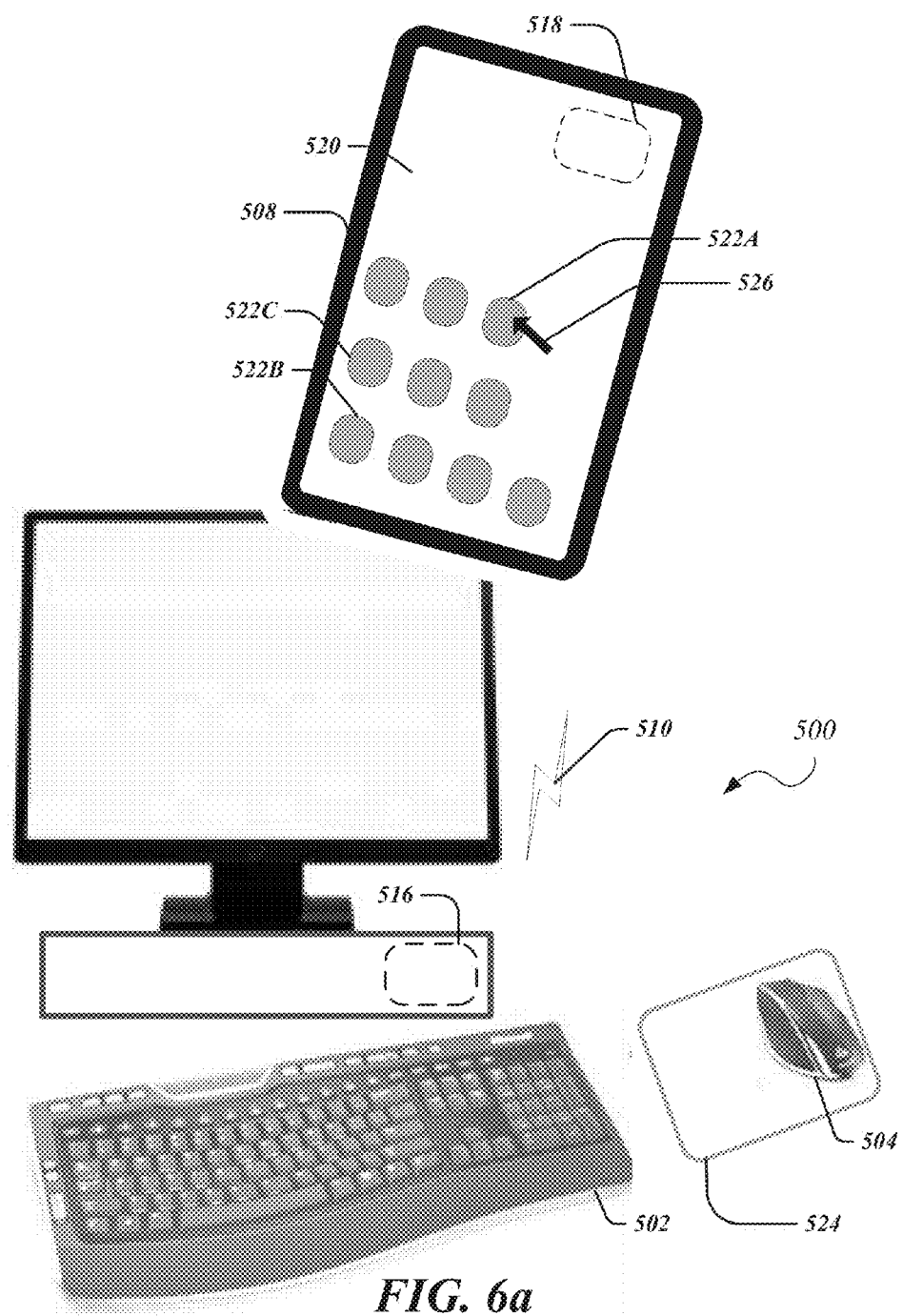
FIGS. 6*a* and 6*b* depict operation of another embodiment in which a mouse is used to control the operation of client.
Figure 6B:
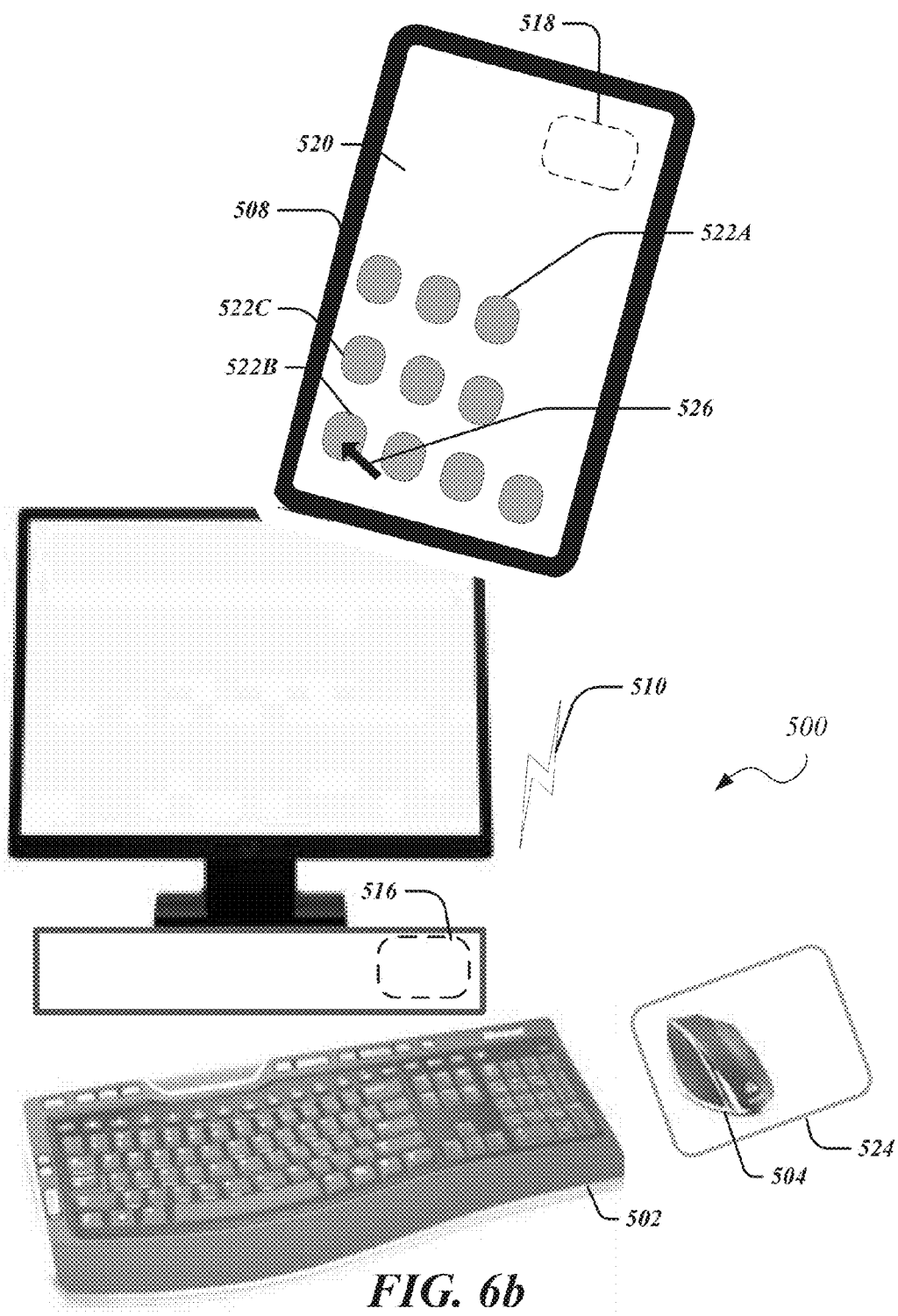

FIGS. 6a and 6b depict operation of another embodiment in which mouse 504 is used to control the operation of client 508. In various embodiments mouse 504 may be wirelessly coupled to client 508 through connection to other components of computing system 500, which may couple to client 508 via wireless link 510. Thus, in some embodiments, an event up-conversion module 104 may be located in keyboard 502 and/or mouse 504. The event up-conversion module 104 may translate events received from mouse 504 into an OS-independent event format for transmission to client 508. In some embodiments, this transmission may take place over wireless link 510 as noted. The client 508 may then translate the OS-independent format of received events into a format for processing by operating system 518.

Thus, even though the operation of mouse 504 may be regulated by the operating system 516 of computing system 500, the mouse 504 may also serve as an indication device for client 508 that is controlled by a separate operating system 518, as illustrated. In the instance depicted in FIG. 6a, the mouse 504 is located at a first position, which is depicted relative to a stationary mousepad 524. This may map a cursor 526 onto an icon 522A of touch screen 520, in the case where an OS on the client 508 supports a mouse function. At a second instance depicted in FIG. 6b, the mouse 504 has moved to another location on mousepad 524, which maps the cursor 526 onto a second icon 522b of touch screen 520. In this manner, a user may employ an external mouse 524 as a navigation tool for client 508, which may provide a more desirable experience in some instances than simply using the conventional touch screen functionality. Although in the above example, a mousepad 524 is employed, in various embodiments the mouse 504 may be used without a mousepad to control operations in the touch screen 520.

Figure 7:
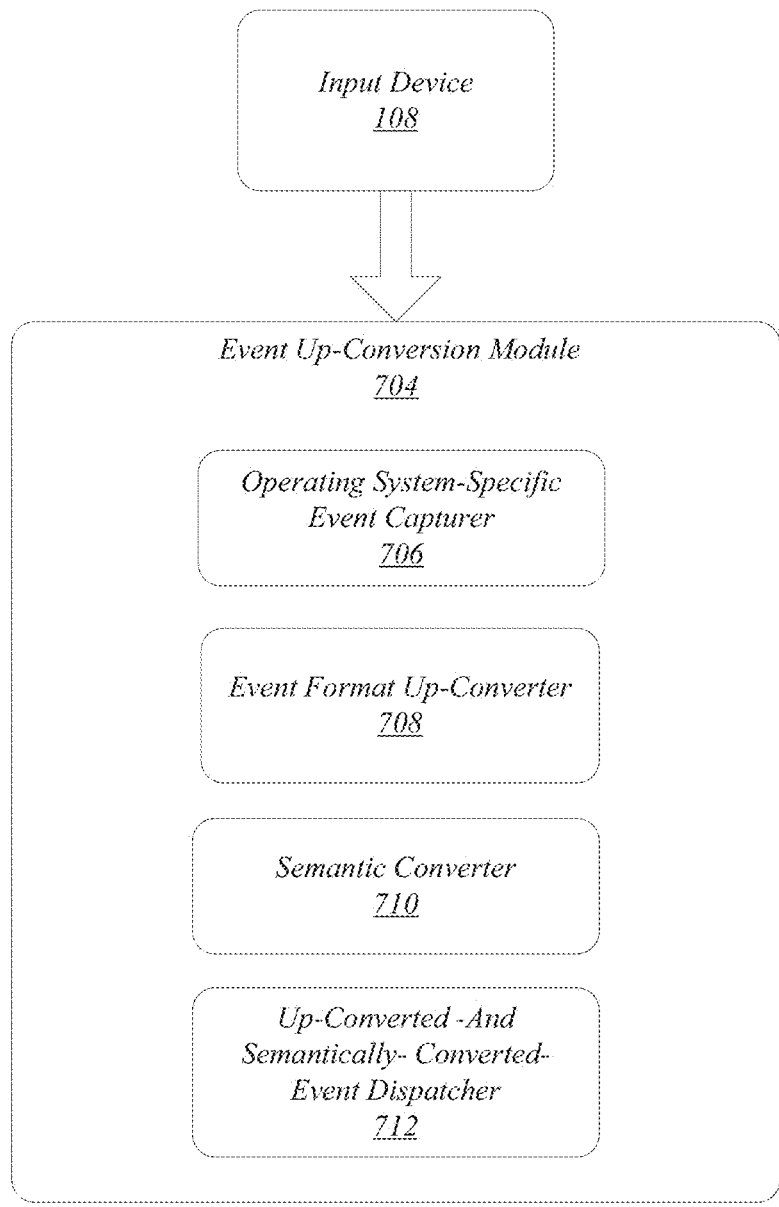
FIG. 7 depicts an event up-conversion module consistent with further embodiments.

FIG. 7 depicts an event up-conversion module 704 consistent with further embodiments. The event up-conversion module 704 includes an OS-specific event capturer 706 that may function as described above with respect to OS-specific event capturer 202. The event up-conversion module 704 may further include an event format up-converter 708 that may function similarly to event format up-converter 204. Event up-conversion module 704 may also contain a semantic converter 710 to perform a semantic conversion of events that have been received from an input device 108. In some embodiments, the semantic converter 710 may be arranged to perform semantic conversion on events after the events are converted into an OS-independent format, while in other embodiments, the semantic converter 710 may operate to perform semantic conversion on events while still in an OS-specific format. In the latter embodiments, the event format up-converter may be arranged to up-convert events that have already undergone a semantic conversion.

Also provided in event up-conversion module 704 is an event dispatcher 712 for dispatching up-converted and semantically converted events. Although the event dispatcher 712 may dispatch up-converted and semantically converted events, it will be understood that event dispatcher 712 may also function to dispatch up-converted events that may not have been semantically converted in cases where such semantic conversion is not required to properly operate a client. As detailed below with respect to FIGS. 8-10, the semantic conversion may operate to convert various types of physical events received from an input device into a single gesture that may be interpreted by a client. In some embodiments, the physical events may comprise a motion or set of motions (which may be a set of events) that are used to control operation of the client. This may afford novel coupling of input devices and clients, thereby extending the flexibility for using clients.

In various embodiments, the up-conversion module may be separate from or may be included in an input device. The input device may itself contain components that are input devices. For example, an input device may be a keyboard or mouse, a temperature sensor, pressure sensor, light sensor, or other type of standalone sensor that is coupled to the up-conversion module. In other embodiments, an input device may contain other input devices. For example, a computing device, communications device, electronic gaming device, electronic appliance or hybrid device, to name a few, may be used as an input device and may contain any of the aforementioned sensors, which may act as input devices. Such devices may also include an up-conversion module to receive and convert events generated by internal input devices.

FIG. 8 depicts one embodiment in which an input device 802 includes the event up-conversion module 704 and a motion measurement unit 804, which may operate to create events in a first format, up-convert the events, and semantically convert the events for dispatch to a client, such as a client 808. In some embodiments, the input device 802 may be a portable device such as a smartphone, remote control, tablet computer or other device. In particular, input device 802 may include a motion measurement unit 804 having components common to known electronic devices.

In various embodiments, in a first operating mode, the motion measurement unit 804 may control operation of the input device 802 itself. For example, the motion measurement unit 804 may include an accelerometer set 810 and gyrometer set 812, and may also include a digital compass 814 and magnetometer 816. Such devices may provide information concerning movement and position of input device 802. For example, accelerometer set 810 and gyrometer set 812 may measure respective changes in velocity and orientation of input device 802. Such components may be used to provide information concerning orientation and changes in orientation of the input device 802. In embodiments where the input device is a rectangular touch screen device, such as a PDA, smartphone, tablet computer, or other mobile display device, the orientation information provided by motion measurement unit 804 may be employed to determine whether the display 820 of input device 802 is currently oriented towards a user in a portrait or landscape orientation. This determination may be used to automatically orient visual content in the display 820 into the appropriate portrait or landscape orientation as in known touch screen devices.

Figure 9A:
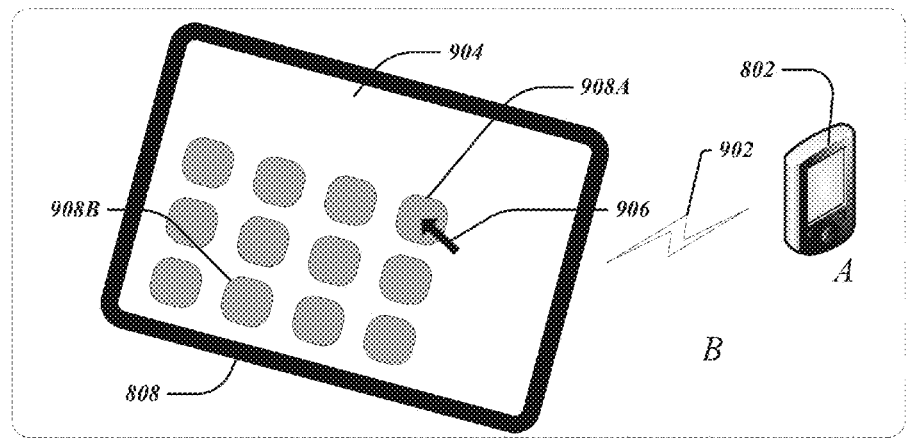
FIG. 9*a* depicts a first instance of use of an input device as an indicating device for a client consistent with various embodiments.

In another mode of operation, input device 802 may employ motion measurement unit 804 and event up-conversion module 704 to provide events to control operation of client 808. In particular, as detailed below with respect to FIGS. 9a-9b, the motion measurement unit 804 may be employed to provide an indicating device function for the client 808. Turning now to FIG. 9a, consistent with the present embodiments there is shown a first instance of use of input device 802 as an indicating device for client 808. In the scenario depicted in FIG. 9a, input device 802 may communicate with client 808 using a wireless link 902 that transmits events generated by input device 802 to control operation of client 808.

Turning once more to FIGS. 7 and 8, the input device 802 may include a transmitter 814 to transmit events over wireless link 818 (902) to client 808, as shown in FIG. 8. The input device 802 may create events by performing certain movements that are detected by motion measurement unit 804. For example, when a user of input device 802 performs movements of input device 802, at least one of components 810-816 of the motion measurement unit 804 may detect the acceleration or change of position or orientation caused by movement of input device 802, and may output signals indicative of the detected movements, positional or rotational changes. In one example, a detected movement or a set of movements may be input to event conversion module 704 as a series of OS-specific events that are formatted according to operating system 818. Using event up-conversion module 704, the OS specific event format may be up-converted to an OS-independent format. Event conversion module 704 may also perform a semantic conversion of events generated by motion measurement unit 804 using semantic converter 710. After undergoing up-conversion and semantic conversion, the movements generated by input device 802 may be forwarded to client 808 via link 818 (902) as events that can control a function of client 808.

Figure 9B:
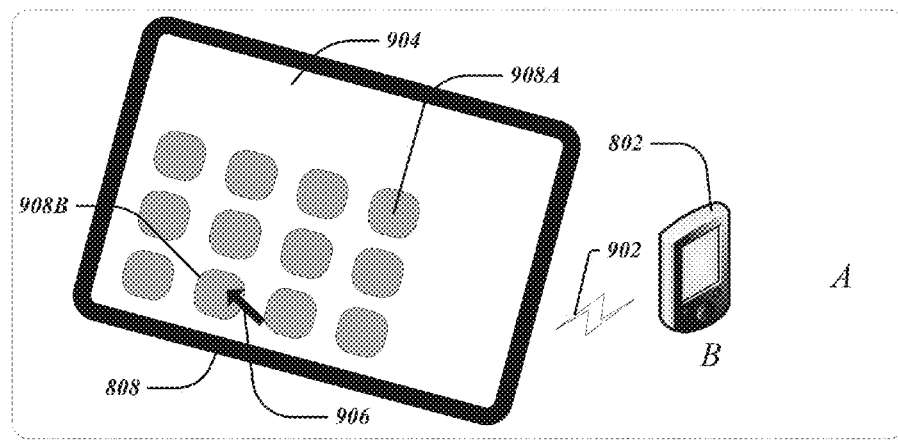
FIG. 9*b* depicts a second instance of the scenario of FIG. 9*a*.

In the particular example of FIGS. 9a-9b, the input device, and more particularly, the motion measurement unit 804, may be used in conjunction with the event conversion module 704 to mimic a mouse when applied to client 808. For example, in the scenario of FIG. 9a, the input device 802 is positioned in a first location A, which may be interpreted by client as a designation of a location on display 904. Thus, a cursor 906 may be placed over a first icon 908A in FIG. 9A. In the instance depicted in FIG. 9b, the input device 802 is positioned at a second location B, which may cause the cursor 906 to be placed over a second icon 908B in display 904. In this manner, the shared input arrangement provided by the present embodiments imparts added functionality not only to the client 808, that is, the functionality of having an indicating device to control selections and navigations, but also imparts added functionality to the input device 802. In other words, the input device 802, which may function in a conventional manner as a smartphone or tablet computer, now attains the unconventional function of an electronic mouse.

In various embodiments, the semantic conversion may involve mapping physical events into a single gesture. For example, a semantic conversion module may include a program or macro sequence that maps multiple physical movements into a single gesture that may be interpreted by a client as a single function. In other embodiments, semantic conversion could be a conversion from a single keystroke into a movement.

Figure 10:
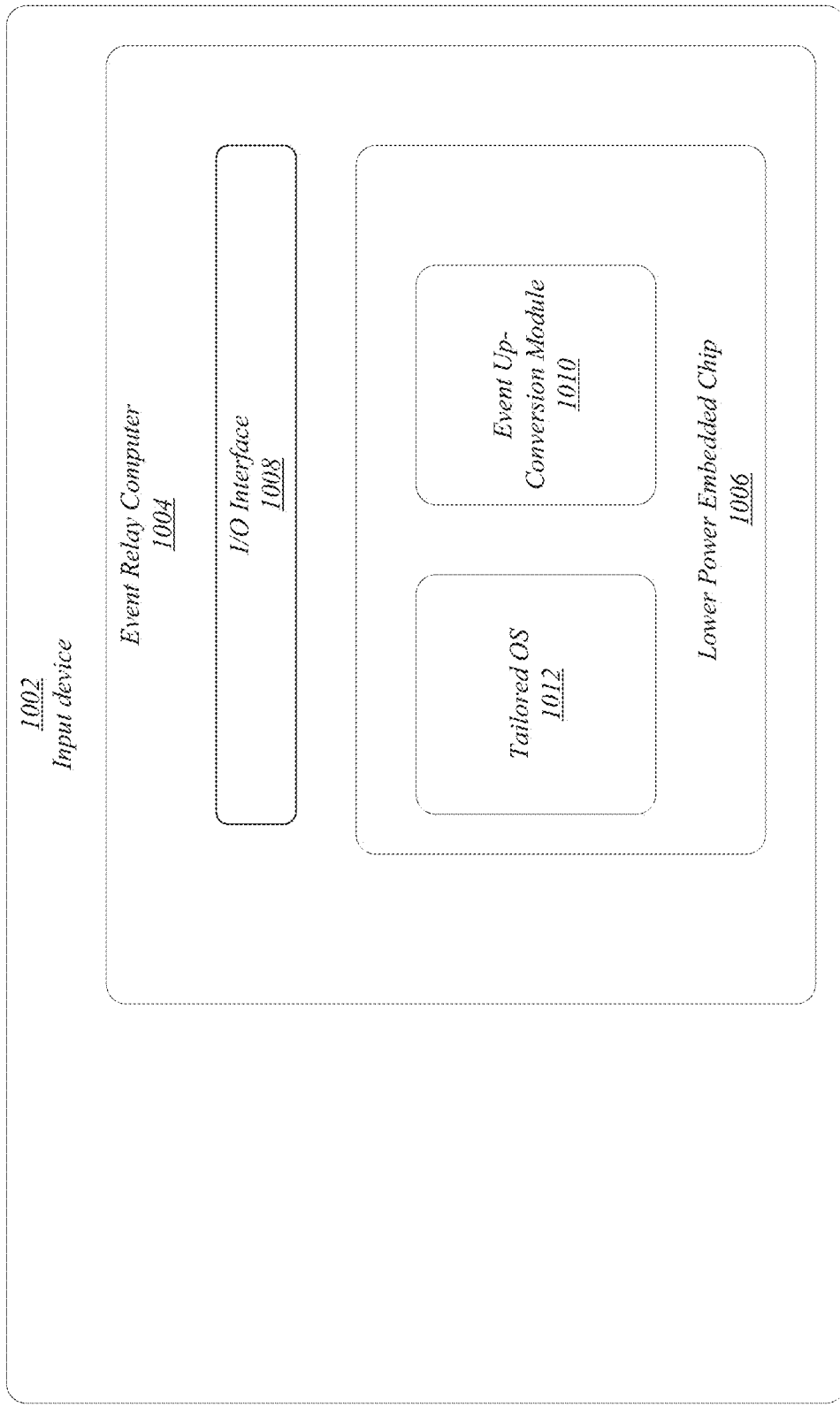
FIG. 10 depicts one embodiment of an input device.

In further embodiments, a miniature embedded computer may be provided within an input device to provide the event relay functions that links an input device running a first operating system to a client running a different operating system. FIG. 10 depicts one embodiment of an input device 1002 that includes an event relay computer 1004, which may include a low power embedded chip 1006 and an input/output (I/O) interface 1008. The lower power embedded chip 1006 may be designed according to a low power system on chip (SOC) architecture. In various embodiments, the I/O interface 1008 may include components such as a universal serial bus (USB) interface, a Bluetooth interface, an IEEE 802.16 (WiMAX), IEEE 802.11 (WiFi) or other known communications interface. In the example illustrated, the low power embedded chip 1006 includes an event up-conversion module 1010 and a tailored operating system 1012, which may be a tailored Linux system in particular embodiments. The tailored OS 1012 may be designed to control linking of input device 1002 to clients as well as controlling communications with the clients for the purposes of event sharing.

It is to be noted that the input device 1002 may include other conventional hardware including other processors, memory, and/or I/O components that provide functionality for conventional operation of the input device 1002. For example, the input device 1002 may be a keyboard designed as an integral component of a computing system that includes a conventional operating system as illustrated in FIGS. 5-6. The compact architecture of the event relay computer 1004 allows it to be integrated into other devices with minimal perturbation to the existing device. For example, the event relay computer 1004 may add very little volume so that the form factor of an existing device is not altered, and may consume minimal additional power.

Figure 11:
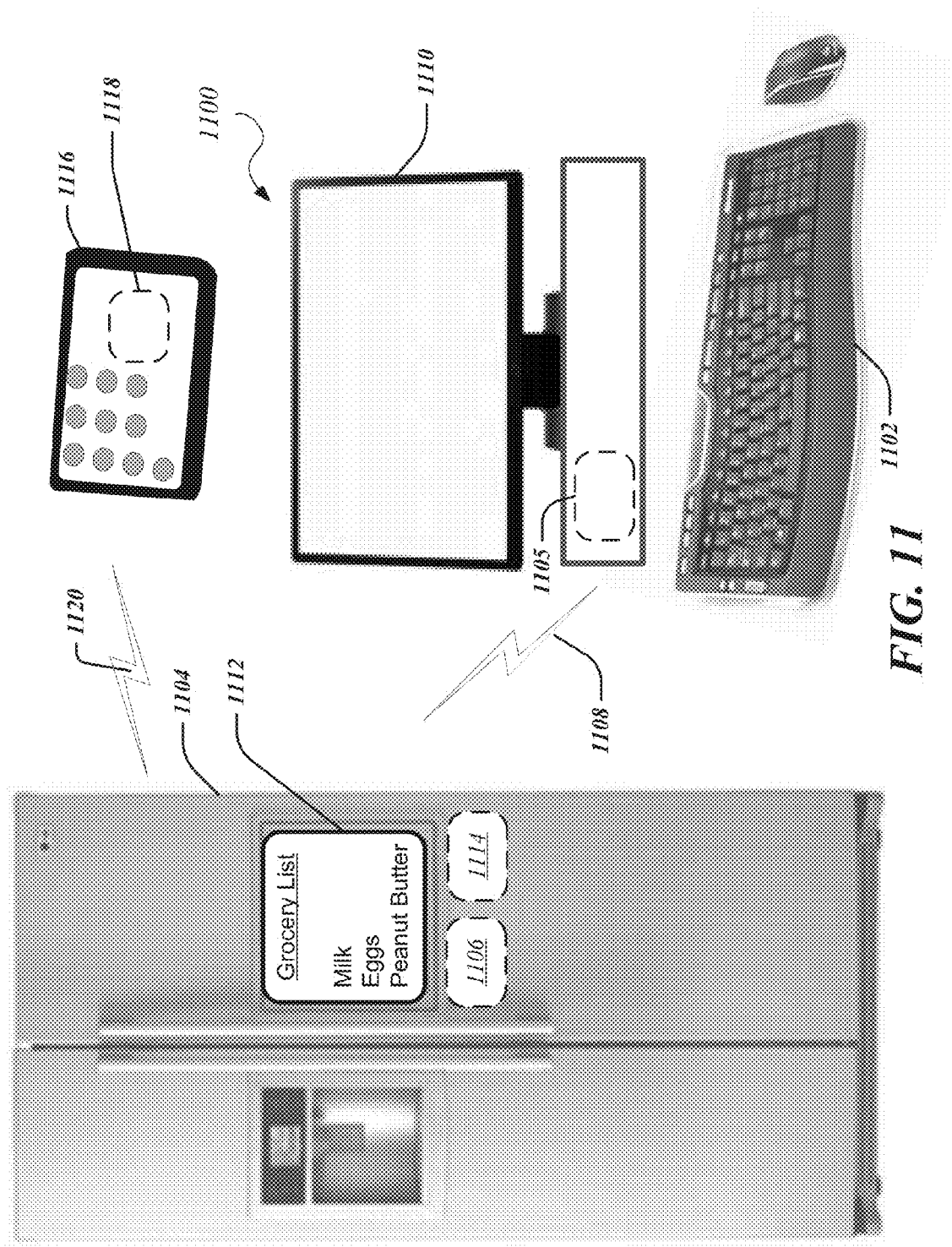
FIG. 11 depicts another embodiment of an input device.

In further embodiments, a single device may contain both an event up-conversion module and down-conversion module. This may facilitate two-way communication where a device in question may act as an input device that generates events to control a client and may also act as a client that receives events from another device (also termed "external device"), where the external device provides input to or controls the device in question. In some embodiments, a first device may operate as an input device to generate events to control a second device, and may act as a client to receive events generated by a third device. FIG. 11 depicts an embodiment in which information may be written to a smart appliance (refrigerator) using a keyboard. The keyboard may be a component of a computer 1100 that includes a monitor 1110. The keyboard 1102 may be connected to an event up-conversion module 1105 in computer 1100 to send up-converted events to a down-conversion module 1106 in refrigerator 1104 over a wireless link 1108. The keyboard keystrokes may be up-converted and used to enter or edit information on refrigerator display 1112. Optionally, the information sent to refrigerator 1104 may be displayed on monitor 1110 so that a user in a first area of a home may view information being sent to refrigerator 1104, which may be located in a different area. This may assure the user of the accuracy of that the information being sent to the refrigerator without the user having to directly view the refrigerator, which may prevent the keyboard from having to be relocated.

In addition, the refrigerator may include an event up-conversion module 1114 that allows the refrigerator to send data from its own sensors to an external device for monitoring. For example, the refrigerator may forward information concerning its temperature in various compartments, warning signals, and other information. In the example depicted in FIG. 11, a tablet computer 1116 may include a down-conversion module 1118 that allows the tablet computer to receive information from the refrigerator 1104 over a link, such as a wireless link 1120.

Figure 12:
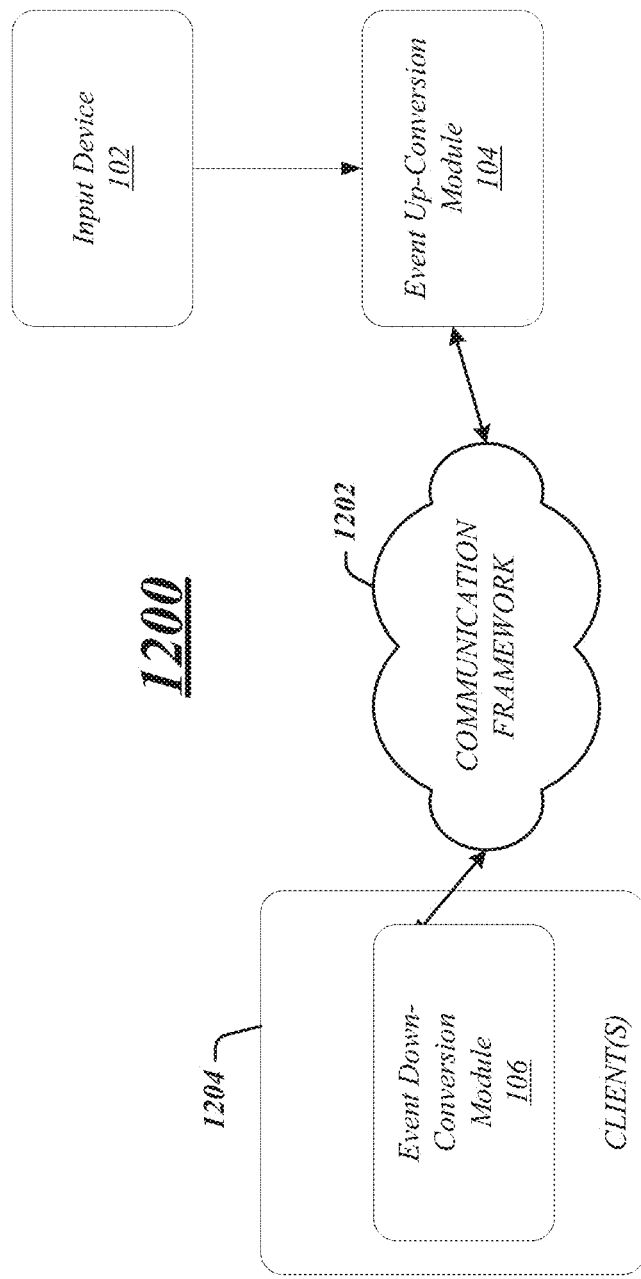
FIG. 12 depicts an architecture in which an input device is coupled to a server that includes an event up-conversion module.

In various other embodiments, event relay may take place over a network or communication framework. This allows a user to extend functionality of a first device by exploiting resources of a second device that may be remotely located from the first device. FIG. 12 depicts an architecture in which an input device 102 is coupled to an event up-conversion module 104 that in turn is coupled to a communication framework 1202. The clients 1204, which may include the event down-conversion module 106, are also coupled to the communication framework 1202, so that the clients 1204 and input device 102 may communicate information between each other using the communication framework 1202. The communications framework 1202 may implement any well-known communications techniques and protocols described further below with respect to FIG. 19. The communications framework 1202 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Figure 13:
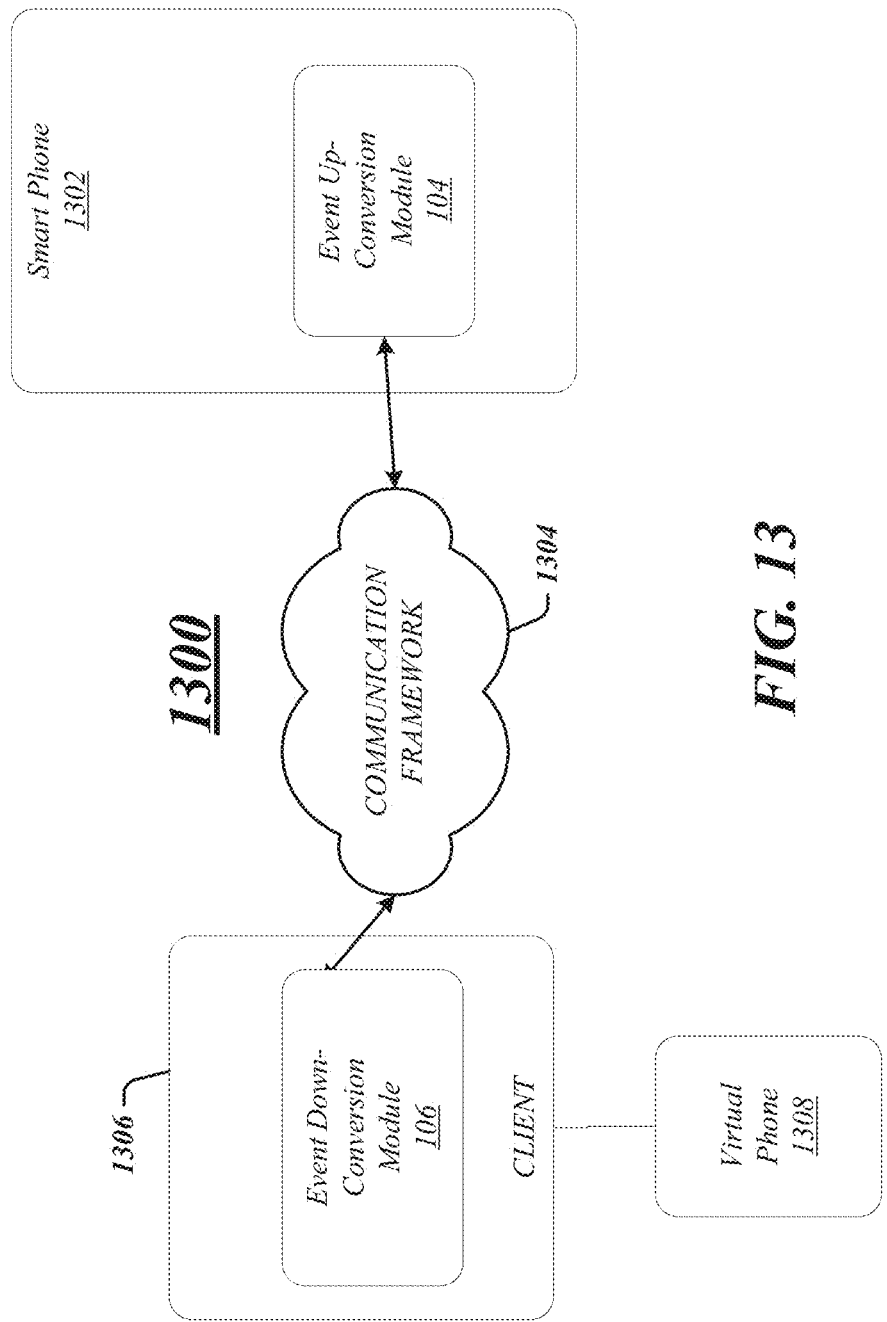
FIG. 13 depicts an implementation of event relay over a communications framework consistent with the present embodiments.

FIG. 13 depicts an implementation of event relay over a communications framework consistent with the present embodiments. A user device, such as a smart phone 1302, includes an up-conversion module 104. As illustrated, up-conversion module 104 may couple to a client 1306 that has an event down-conversion module 106 via the communications framework 1304. The client 1306, in turn, may be coupled to a virtual phone 1308. A user of smartphone 1302 may access virtual phone 1308 to enhance the capabilities of the smartphone 1302. For example, the user's smart phone 1302 may have limited computing power that retards the performance of certain operations (applications) that may be computation intensive. The user may perform certain actions on an interface in smart phone 1302 that invoke operations requiring computations, and the smart phone 1302 may subsequently establish a link to forward up-converted events based on the user's actions to the virtual phone 1308. The client 1306 then down-converts the events for processing by virtual phone 1308, which performs the required computations and returns the results to the smart phone 1302 for example, in the form of screen data. Because of the event relay architecture 1300, the user's smart phone may employ any operating system and still be able to access a virtual phone, which may be arranged using a different operating system. It is to be noted that in the example of FIG. 13, client 1306 may include an up-conversion module and the smartphone 1302 may include a down-conversion module to facilitate return of the computations from virtual phone 1306 to smart phone 1302, which may run different operating systems.

In further embodiments, a virtual phone may transmit hypothetic input data to a remotely located real phone in order to invoke applications or perform system management. This may be useful in the case of managing data and communications in an enterprise environment where security concerns may be important.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 14:
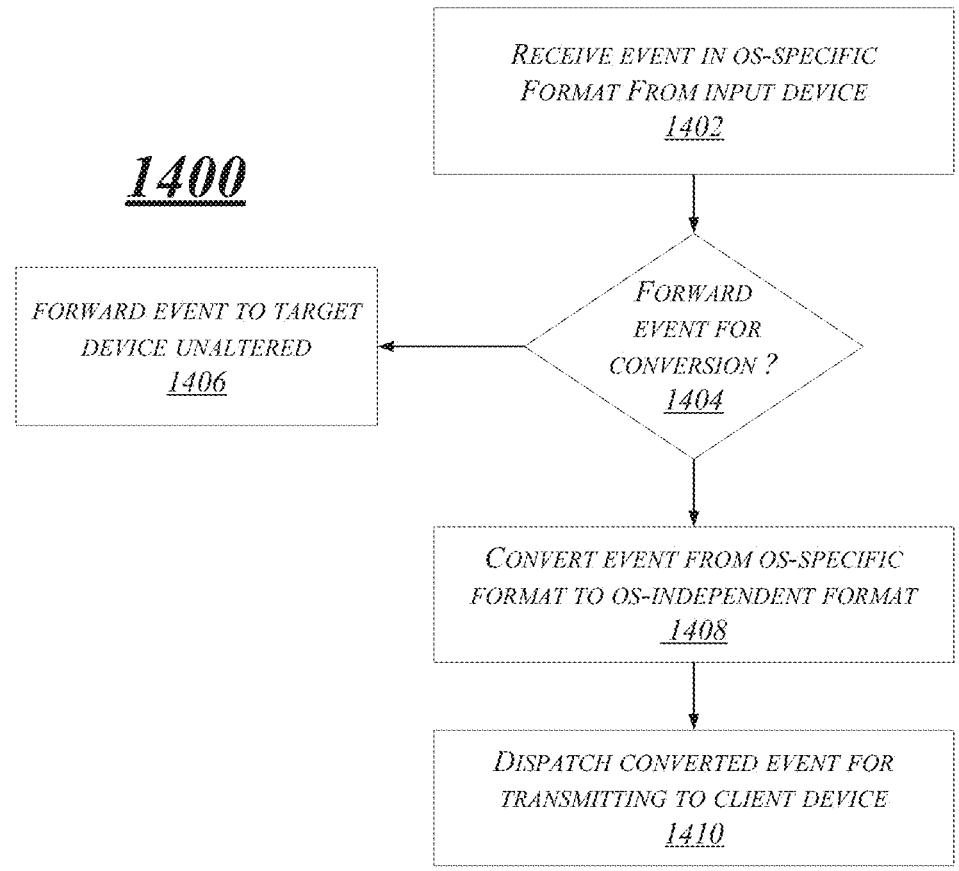
FIG. 14 illustrates an exemplary logic flow.

FIG. 14 illustrates an exemplary logic flow 1400. At block 1402 events are received in an OS-specific format from an input device. In some embodiments the events may be received in a component of the input device, such as a module for up-converting events. At block 1404 a decision is made as to whether to forward the event for conversion. If the event is not to be forwarded for conversion, the flow moves to block 1406, where the event may be forwarded to a target application unaltered. For example, an event may comprise input from a first component of the input device that is meant to be processed locally by a second component of the input device itself. Accordingly, the event format of the received event may require no adjusting since the first component and second component may be controlled by the same operating system. In another scenario, if the event is to be forwarded from an input device to an application in a target device that runs the same operating system, the event may be forwarded with no conversion. If, at block 1404, the event is to be forwarded for conversion, the logic flow moves to block 1408. At block 1408 the event format is converted from an OS-specific format to an OS-independent format. At block 1410 the up-converted event is forwarded to a client for processing.

It is to be noted that consistent with some embodiments, an input device need not have any knowledge of the OS of a client to be served by the input device. Accordingly, a client and input device may share the same operating system. The present embodiments provide the advantage that a common lightweight event relay architecture allows an input device to control any other client whether or not the input device and client share a common OS. Because of the lightweight architecture, excessive use of resources and processing of events is avoided whether or not up-conversion is required.

Figure 15:
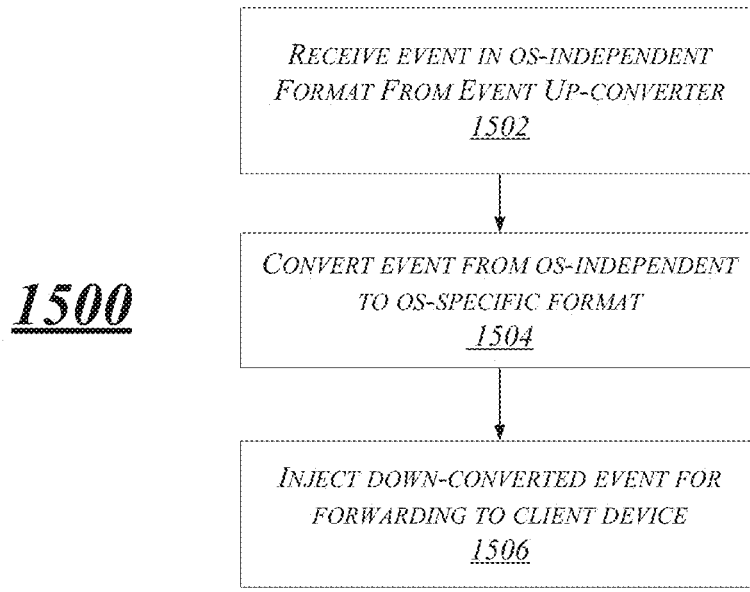
FIG. 15 illustrates another exemplary logic flow.

FIG. 15 illustrates another exemplary logic flow 1500. At block 1502 events are received in an OS-independent format from an event up-converter. At block 1504 the event is converted from an OS-independent format to an OS-specific format. At block 1506 a down-converted event is forwarded to a client.

Figure 16:
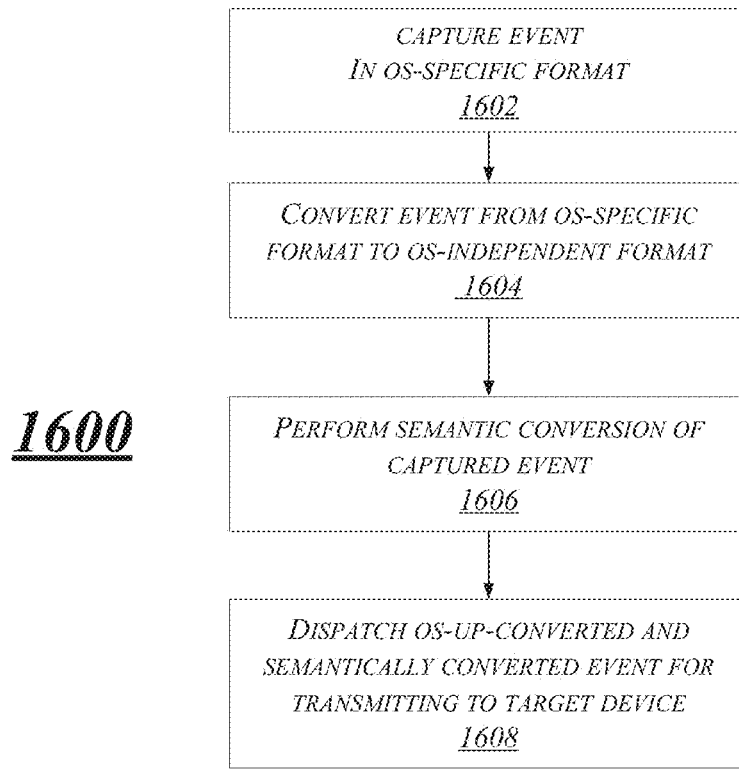
FIG. 16 illustrates a further exemplary logic flow.

FIG. 16 illustrates a further exemplary logic flow 1600. At block 1602 events are captured in an OS-specific format. At block 1604 the event is converted from an OS-specific to an OS-independent format. At block 1606 a semantic conversion is applied to the captured event. In some embodiments, the block 1606 may take place subsequently to block 1604, in which case semantic conversion takes place on an event arranged in an OS-independent format. In some cases, the block 1606 may take place before the block 1604, in which case the semantic conversion takes place on events arranged in an OS-specific event format. At block 1608, the up-converted and semantically converted event is dispatched for transmitting to a client.

Figure 17:
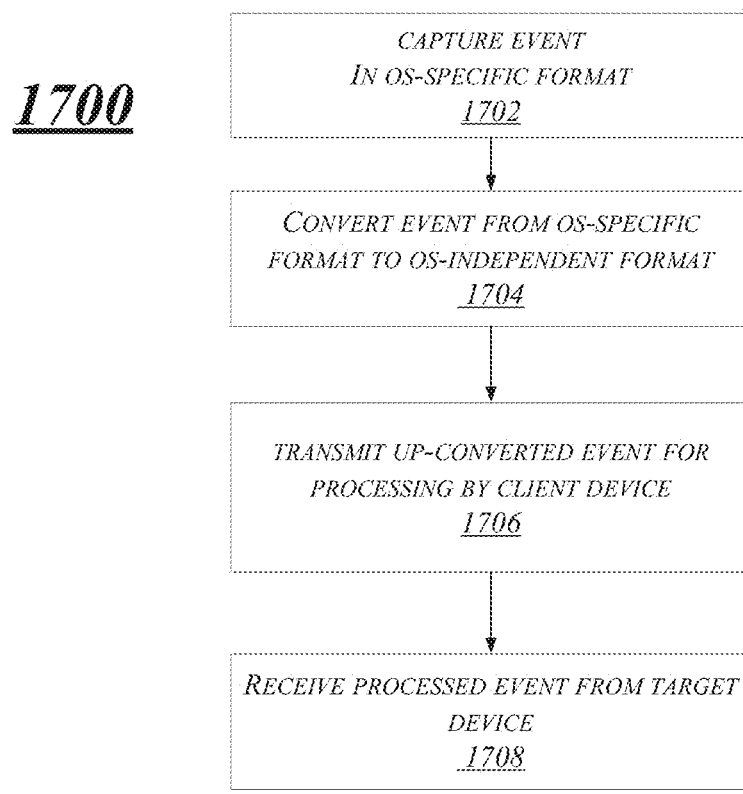
FIG. 17 illustrates another logic flow.

FIG. 17 illustrates another logic flow 1700. At block 1702 an unprocessed event is captured in an OS-specific format. At block 1704, the format of the captured event is up-converted from an OS-specific format to an OS-independent format. At block 1706, the up-converted event is transmitted for processing by a client.

At block 1708 the processed event is received from the client. In some embodiments, the processed event may be received and down-converted by the same input device used to generate the unprocessed event. A user may thus effectively perform tasks in an application of an input device by harnessing a client that runs a different operating system than the input device. The client then processes the events and returns them to the original input device, which can down-convert the processed events for use on the local input device.

Figure 18:
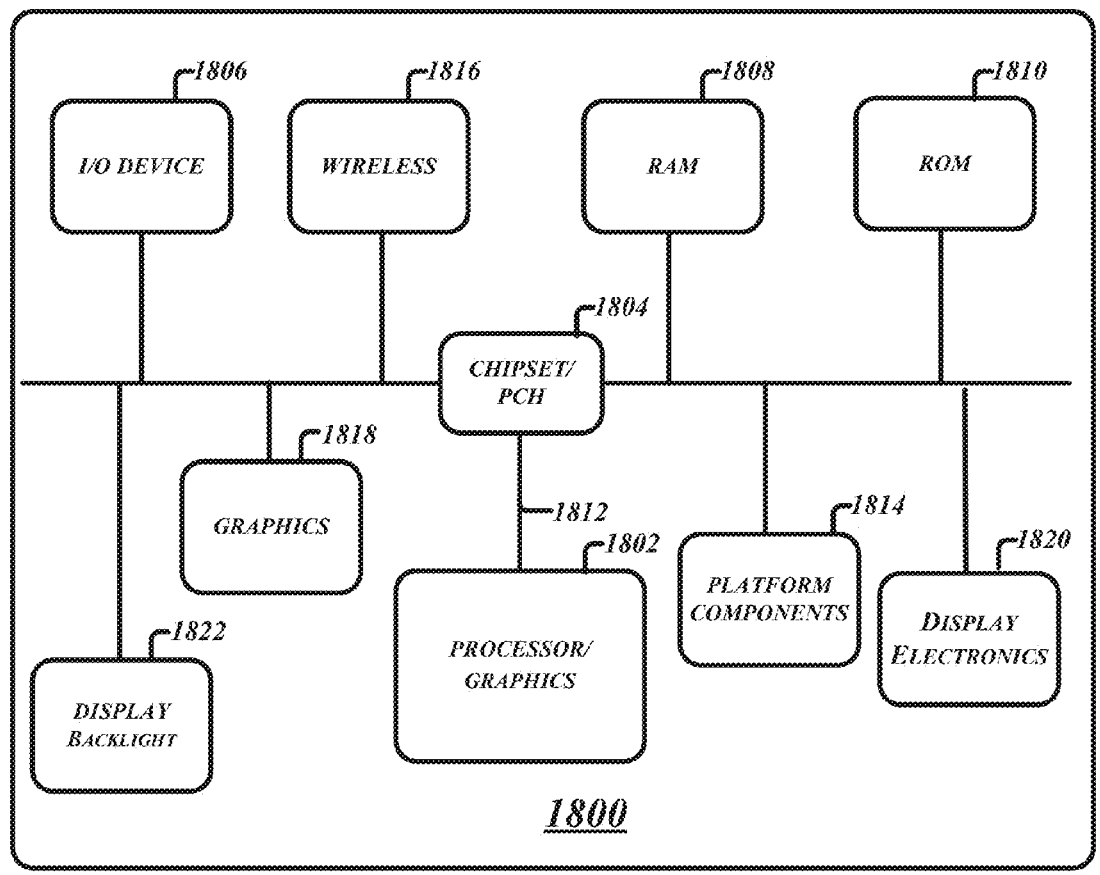
FIG. 18 illustrates one embodiment of a computing system.

FIG. 18 is a diagram of an exemplary system embodiment and in particular, FIG. 18 is a diagram showing a platform 1800, which may include various elements. For instance, FIG. 18 shows that platform (system) 1810 may include a processor/graphics core 1802, a chipset/platform control hub (PCH) 1804, an input/output (I/O) device 1806, a random access memory (RAM) (such as dynamic RAM (DRAM)) 1808, and a read only memory (ROM) 1810, display electronics 1820, display backlight 1822, and various other platform components 1814 (e.g., a fan, a crossflow blower, a heat sink, DTM system, cooling system, housing, vents, and so forth). System 1800 may also include wireless communications chip 1816 and graphics device 1818. The embodiments, however, are not limited to these elements.

As shown in FIG. 18, I/O device 1806, RAM 1808, and ROM 1810 are coupled to processor 1802 by way of chipset 1804. Chipset 1804 may be coupled to processor 1802 by a bus 1812. Accordingly, bus 1812 may include multiple lines.

Processor 1802 may be a central processing unit comprising one or more processor cores and may include any number of processors having any number of processor cores. The processor 1802 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1802 may be multiple separate processors located on separate integrated circuit chips. In some embodiments processor 1802 may be a processor having integrated graphics, while in other embodiments processor 1802 may be a graphics core or cores.

Figure 19:
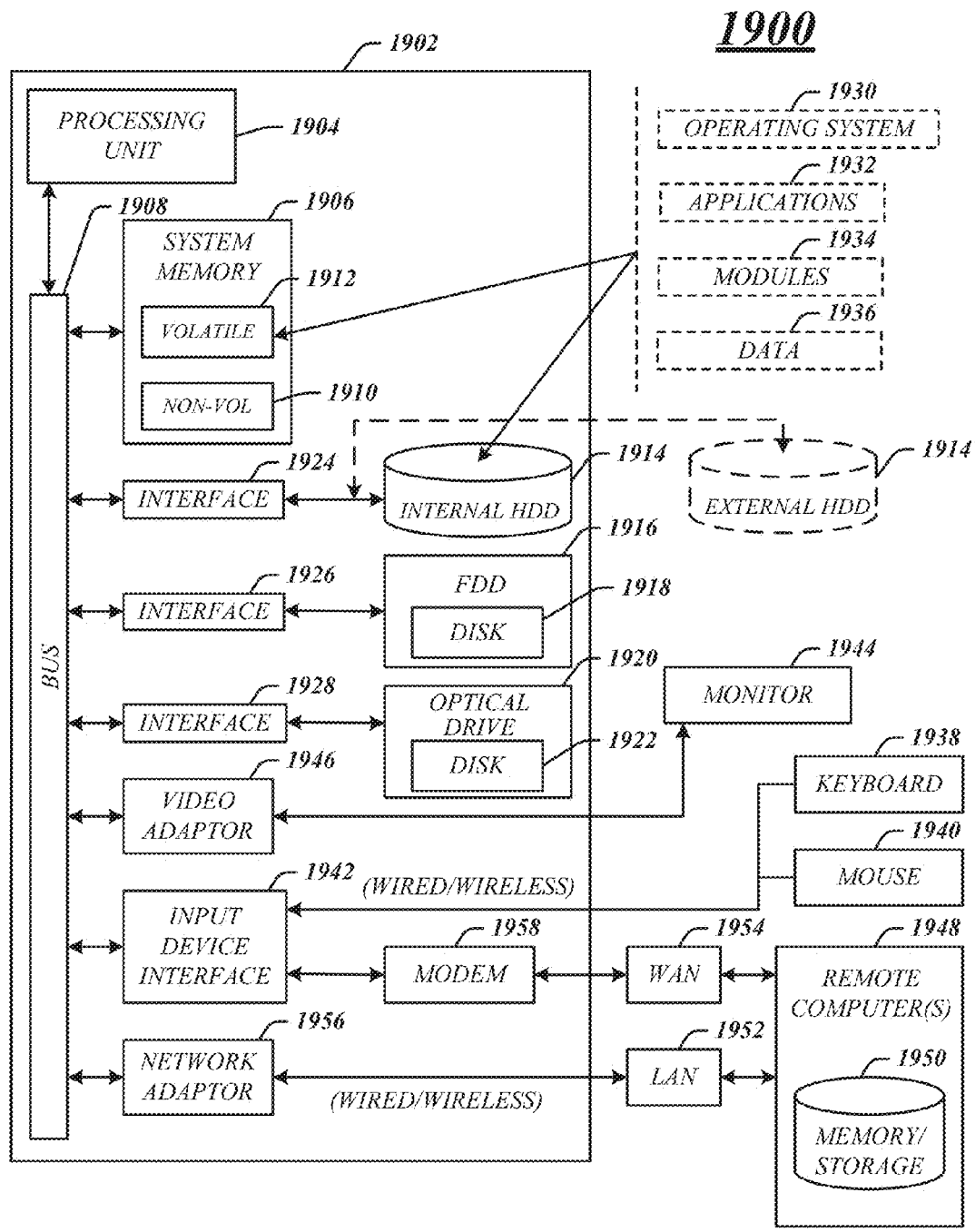
FIG. 19 illustrates one embodiment of a computing architecture.

FIG. 19 illustrates an embodiment of an exemplary computing architecture 1900 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1900 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1900 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1900.

As shown in FIG. 19, the computing architecture 1900 comprises a processing unit 1904, a system memory 1906 and a system bus 1908. The processing unit 1904 can be any of various commercially available processors. Dual microprocessors and other multi processor architectures may also be employed as the processing unit 1904. The system bus 1908 provides an interface for system components including, but not limited to, the system memory 1906 to the processing unit 1904. The system bus 1908 can be any of several types of bus structure that may further interconnect to a memory bus (with or without a memory controller), a peripheral bus, and a local bus using any of a variety of commercially available bus architectures.

The computing architecture 1900 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 19, the system memory 1906 can include non-volatile memory 1910 and/or volatile memory 1912. A basic input/output system (BIOS) can be stored in the non-volatile memory 1910.

The computer 1902 may include various types of computer-readable storage media in the form of one or more lower speed memory units, including an internal hard disk drive (HDD) 1914, a magnetic floppy disk drive (FDD) 1916 to read from or write to a removable magnetic disk 1918, and an optical disk drive 1920 to read from or write to a removable optical disk 1922 (e.g., a CD-ROM or DVD). The HDD 1914, FDD 1916 and optical disk drive 1920 can be connected to the system bus 1908 by a HDD interface 1924, an FDD interface 1926 and an optical drive interface 1928, respectively. The HDD interface 1924 for external drive implementations can include at least one or both of Universal Serial Bus (USB) and IEEE 1994 interface technologies.

The drives and associated computer-readable media provide volatile and/or nonvolatile storage of data, data structures, computer-executable instructions, and so forth. For example, a number of program modules can be stored in the drives and memory units 1910, 1912, including an operating system 1930, one or more application programs 1932, other program modules 1934, and program data 1936.

A user can enter commands and information into the computer 1902 through one or more wire/wireless input devices, for example, a keyboard 1938 and a pointing device, such as a mouse 1940. Other input devices may include a microphone, an infra-red (IR) remote control, a joystick, a game pad, a stylus pen, touch screen, or the like. These and other input devices are often connected to the processing unit 1904 through an input device interface 1942 that is coupled to the system bus 1908, but can be connected by other interfaces such as a parallel port, IEEE 1994 serial port, a game port, a USB port, an IR interface, and so forth.

A monitor 1944 or other type of display device is also connected to the system bus 1908 via an interface, such as a video adaptor 1946. In addition to the monitor 1944, a computer typically includes other peripheral output devices, such as speakers, printers, and so forth.

The computer 1902 may operate in a networked environment using logical connections via wire and/or wireless communications to one or more remote computers, such as a remote computer 1948. The remote computer 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wire/wireless connectivity to a local area network (LAN) 1952 and/or larger networks, for example, a wide area network (WAN) 1954. Such LAN and WAN networking environments are commonplace in offices and companies, and facilitate enterprise-wide computer networks, such as intranets, all of which may connect to a global communications network, for example, the Internet.

When used in a LAN networking environment, the computer 1902 is connected to the LAN 1952 through a wire and/or wireless communication network interface or adaptor 1956. The adaptor 1956 can facilitate wire and/or wireless communications to the LAN 1952, which may also include a wireless access point disposed thereon for communicating with the wireless functionality of the adaptor 1956.

When used in a WAN networking environment, the computer 1902 can include a modem 1958, or is connected to a communications server on the WAN 1954, or has other means for establishing communications over the WAN 1954, such as by way of the Internet. The modem 1958, which can be internal or external and a wire and/or wireless device, connects to the system bus 1908 via the input device interface 1942. In a networked environment, program modules depicted relative to the computer 1902, or portions thereof, can be stored in the remote memory/storage device 1950. It will be appreciated that the network connections shown are exemplary and other means of establishing a communications link between the computers can be used.

The computer 1902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
 a processor arranged to receive input from an input device;
 a first event conversion module operative on the processor to:
  receive an input event from the input device as an operating system (OS)-specific event arranged in a format operable by a first operating system;
  convert the OS-specific event into a first converted event having an OS-independent format; and
  send the first converted event for processing; and
 a second event conversion module operative on the processor to:
  receive a second converted event having an OS-independent format;
  convert the second converted event into a third converted event having an OS-specific event format; and
  inject the third converted event into a queue for processing by the input device.

2. The apparatus of claim 1, the OS-independent format comprising a format capable of conversion to an OS-specific format operable by a second operating system different from the first operating system.

3. The apparatus of claim 1, the OS-independent format comprising a format capable of conversion to an OS-specific format operable by a second operating system the same as the first operating system.

4. The apparatus of claim 1, at least the first event conversion module or the second event conversion module arranged within the input device.

5. The apparatus of claim 1, the input device comprising one of a mobile display device, a keyboard, or a mouse.

6. The apparatus of claim 1, the first event conversion module arranged to perform a semantic conversion of the received input.

7. The apparatus of claim 1, comprising a motion measurement unit arranged within the input device to generate an input event to undergo semantic conversion.

8. The apparatus of claim 1, the first event conversion module arranged to perform a semantic conversion of the received input to map multiple movements into a single gesture.

9. A system, comprising:
 a keyboard;
 a processor to receive an input event from the keyboard;
 a first event conversion module operative on the processor to:
  receive the input event as an operating system (OS)-specific event arranged in a format operable by a first operating system;
  convert the OS-specific event into a first converted event having an OS-independent format; and
  send the first converted event for processing; and
 a second event conversion module operative on the processor to:
  receive a second converted event having an OS-independent format;
  convert the second converted event into a third converted event having an OS-specific event format; and
  inject the third converted event into a queue for processing.

10. The system of claim 9, the OS-independent format comprising a format capable of conversion to an OS-specific format operable by a second operating system different from the first operating system.

11. The system of claim 9, the keyboard comprising a wireless transmitter to transmit the sent first converted event to the client.

12. The system of claim 9, at least the first event conversion module or the second event conversion module arranged within the keyboard.

13. The system of claim 9, the keyboard comprising a computer that includes a processor chip and an input/output interface that includes a universal serial bus (USB) port, a wireless interface, or a USB port and a wireless interface.

14. The system of claim 13, the processor chip comprising the first event conversion module and a tailored operating system.

15. An article of manufacture, comprising a computer-readable storage medium containing instructions that when executed by a processor enable a system to:
 receive an input event from the input device as an operating system (OS)-specific event arranged in a format for a first operating system;
 convert the OS-specific event into a first converted event having an OS-independent format;
 send the first converted event for processing;
 receive a second converted event having an OS-independent format;
 convert the second converted event into a third converted event having an OS-specific event format; and
 inject the third converted event into a queue for processing by the input device.

16. The article of manufacture of claim 15, containing instructions that when executed by a processor enable a system to convert the OS-specific event into a converted event that has an OS-independent format capable of conversion to an OS-specific format for a second operating system different from the first operating system.

17. The article of manufacture of claim 15, containing instructions that when executed by a processor enable a system to perform a semantic conversion of the received input event.

18. The article of manufacture of claim 15, containing instructions that when executed by a processor enable a system to:
 receive input corresponding to a set of movements from a motion measurement unit; and
 perform semantic conversion based upon the input corresponding to the set of movements.

19. The article of manufacture of claim 15, containing instructions that when executed by a processor enable a system to perform a semantic conversion to map multiple movements into a single gesture.

20. The article of manufacture of claim 15, containing instructions that when executed by a processor enable a system to receive input based on the first converted event after the first converted event is converted from an OS-independent format to an OS-specific event format and processed by the client.

21. A method, comprising:
  determining that an OS-specific input event received from an input device is to be transmitted;
  converting the OS-specific event into a first converted event having an OS-independent format;
  sending the first converted event for processing;
  receiving a second converted event having an OS-independent format;
  converting the second converted event into a third converted event having an OS-specific event format; and
  injecting the third converted event into a queue for processing by the input device.

22. The method of claim 21, comprising converting the OS-specific event into a first converted event having an OS-independent format capable of conversion to an OS-specific format for a second operating system different from the first operating system.

23. The method of claim 21, comprising performing a semantic conversion before converting the OS-specific event into the first converted event having an OS-independent format.

24. The method of claim 21, comprising performing a semantic conversion after converting the OS-specific event into the first converted event having an OS-independent format.

25. The method of claim 23 comprising performing semantic conversion to map multiple movements received as input events into a single gesture.

26. The method of claim 21, comprising receiving input from the client based on the first converted event after the first converted event is converted into an OS-specific event format and processed by a client.

* * * * *